(12) United States Patent
Wong

(10) Patent No.: US 11,846,773 B2
(45) Date of Patent: Dec. 19, 2023

(54) OPTICAL SYSTEM

(71) Applicant: 3M INNOVATIVE PROPERTIES COMPANY, St. Paul, MN (US)

(72) Inventor: Timothy L. Wong, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 483 days.

(21) Appl. No.: 16/758,700

(22) PCT Filed: Oct. 23, 2018

(86) PCT No.: PCT/IB2018/058260
§ 371 (c)(1),
(2) Date: Apr. 23, 2020

(87) PCT Pub. No.: WO2019/082080
PCT Pub. Date: May 2, 2019

(65) Prior Publication Data
US 2020/0341267 A1    Oct. 29, 2020

Related U.S. Application Data

(60) Provisional application No. 62/578,057, filed on Oct. 27, 2017.

(51) Int. Cl.
*G02B 27/00* (2006.01)
*G02B 5/30* (2006.01)

(52) U.S. Cl.
CPC ......... *G02B 27/005* (2013.01); *G02B 5/3041* (2013.01)

(58) Field of Classification Search
CPC ............................ G02B 5/3041; G02B 27/005
(Continued)

(56) References Cited

U.S. PATENT DOCUMENTS 4,641,927 A    2/1987 Prescott
5,515,185 A    5/1996 Kim
(Continued)

FOREIGN PATENT DOCUMENTS

CN    105676477 A    6/2016
CN    106054361 A    10/2016
(Continued)

OTHER PUBLICATIONS

International Search Report for PCT International Application No. PCT/IB2018/058260, dated Mar. 19, 2019, 9 pages.
(Continued)

*Primary Examiner* — Wyatt A Stoffa
*Assistant Examiner* — Mitchell T Oestreich
(74) *Attorney, Agent, or Firm* — Clifton F. Richardson

(57) ABSTRACT

Optical systems including a reflective polarizer are described. The reflective polarizer includes first and second reflection zones, such that for light substantially normally incident on the reflective polarizer, the first zone substantially reflects light in a first wavelength range and substantially transmits light in a different non-overlapping second wavelength range, and the second zone substantially reflects light in the second wavelength range and substantially transmits light in the first wavelength range. The first and second reflection zones have first and second thicknesses having corresponding first and second mid-points separated by a distance d. In some embodiments, a longitudinal chromatic aberration of the optical imaging system of the first wavelength range to the second wavelength range caused when reducing d so that the first and second reflection zones are immediately adjacent is a distance h where $0.3h < d < 0.7h$.

11 Claims, 13 Drawing Sheets

(58) Field of Classification Search
USPC .......................................................... 359/298
See application file for complete search history.

(56) References Cited

U.S. PATENT DOCUMENTS

| | | | |
|---|---|---|---|
| 5,526,185 A | 6/1996 | Herloski | |
| 5,882,774 A | 3/1999 | Jonza | |
| 6,300,991 B1 | 10/2001 | Schadt | |
| 6,515,801 B1 | 2/2003 | Shimizu | |
| 6,609,795 B2 | 8/2003 | Weber | |
| 7,123,418 B2 | 10/2006 | Weber | |
| 7,156,521 B2 | 1/2007 | Kawai | |
| 8,210,678 B1 | 7/2012 | Farwig | |
| 9,097,887 B2 | 8/2015 | Matsumoto | |
| 9,557,568 B1 * | 1/2017 | Ouderkirk | B29D 11/00644 |
| 2002/0180916 A1 | 12/2002 | Schadt | |
| 2003/0028048 A1 | 2/2003 | Cherkaoui | |
| 2004/0233524 A1 | 11/2004 | Lippey | |
| 2005/0072959 A1 | 4/2005 | Moia | |
| 2006/0017891 A1 | 1/2006 | Conner | |
| 2006/0109399 A1 | 5/2006 | Kubota | |
| 2006/0197068 A1 | 9/2006 | Schadt | |
| 2010/0254002 A1 | 10/2010 | Merrill | |
| 2011/0032487 A1 | 2/2011 | Inoko | |
| 2011/0286095 A1 | 11/2011 | Merrill et al. | |
| 2013/0077029 A1 * | 3/2013 | Nagato | G02B 5/288 |
| | | | 359/590 |
| 2013/0093992 A1 | 4/2013 | Takahashi et al. | |
| 2014/0016051 A1 | 1/2014 | Kroll et al. | |
| 2014/0253849 A1 | 9/2014 | Poon | |
| 2017/0017077 A1 | 1/2017 | Tang et al. | |
| 2018/0164590 A1 | 6/2018 | Li | |

FOREIGN PATENT DOCUMENTS

| | | |
|---|---|---|
| EP | 1544666 A1 | 6/2005 |
| EP | 1571467 | 9/2005 |
| EP | 1804094 A1 | 7/2007 |
| EP | 2413186 | 2/2012 |
| JP | 2006-343413 A | 12/2006 |
| WO | WO 2007-097595 A1 | 8/2007 |
| WO | 2013062932 A1 | 5/2013 |
| WO | 2017039713 A1 | 3/2017 |

OTHER PUBLICATIONS

Marques-Hueso, Properties of silicon integrated photonic lenses: bandwidth, chromatic aberration, and polarization dependence, Optical Engineering 52(9), 091710, Sep. 2013, 8 pp.

* cited by examiner

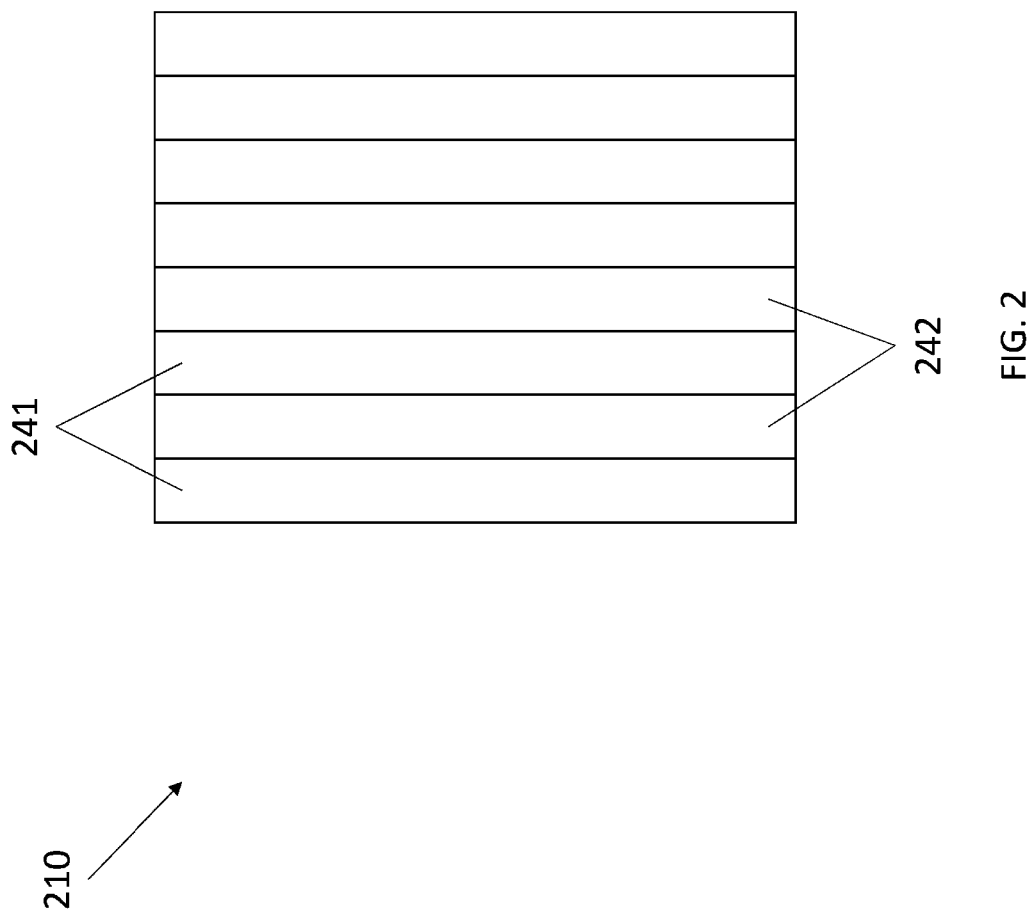

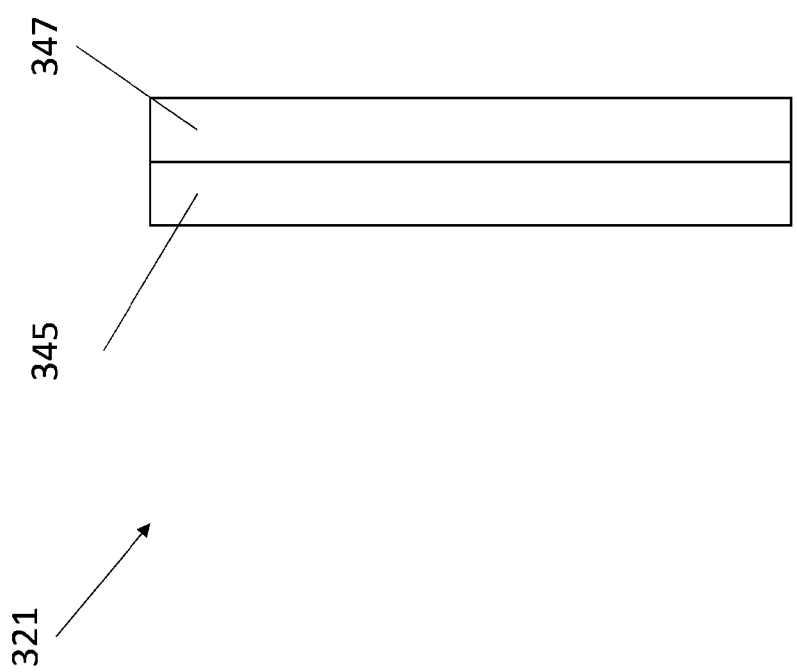

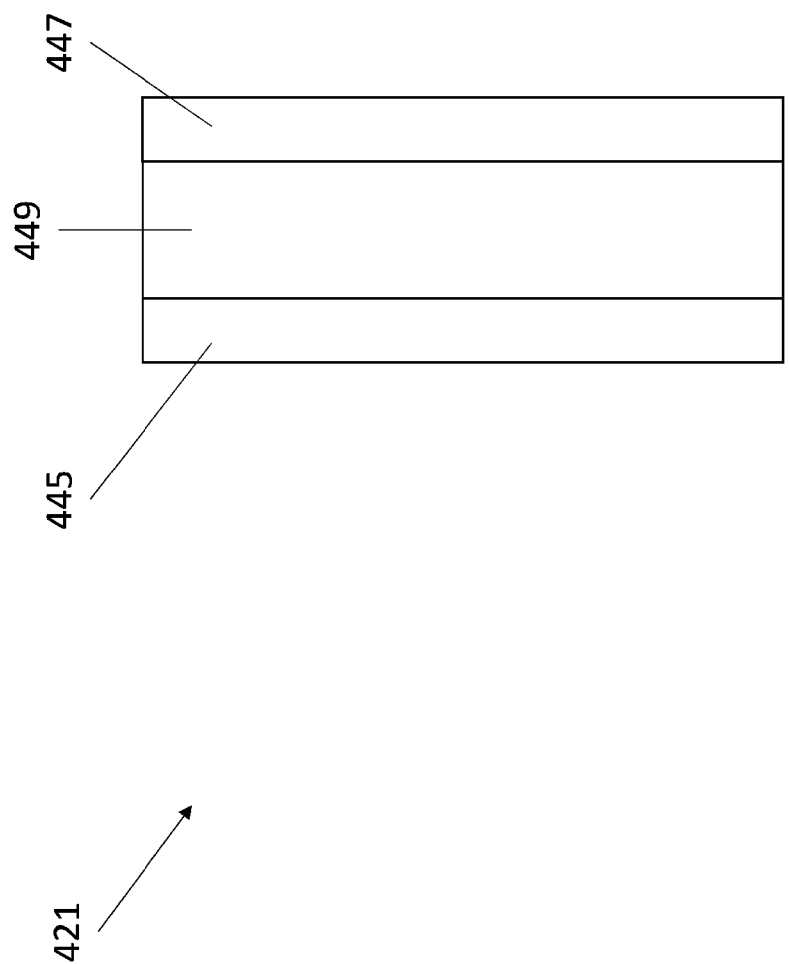

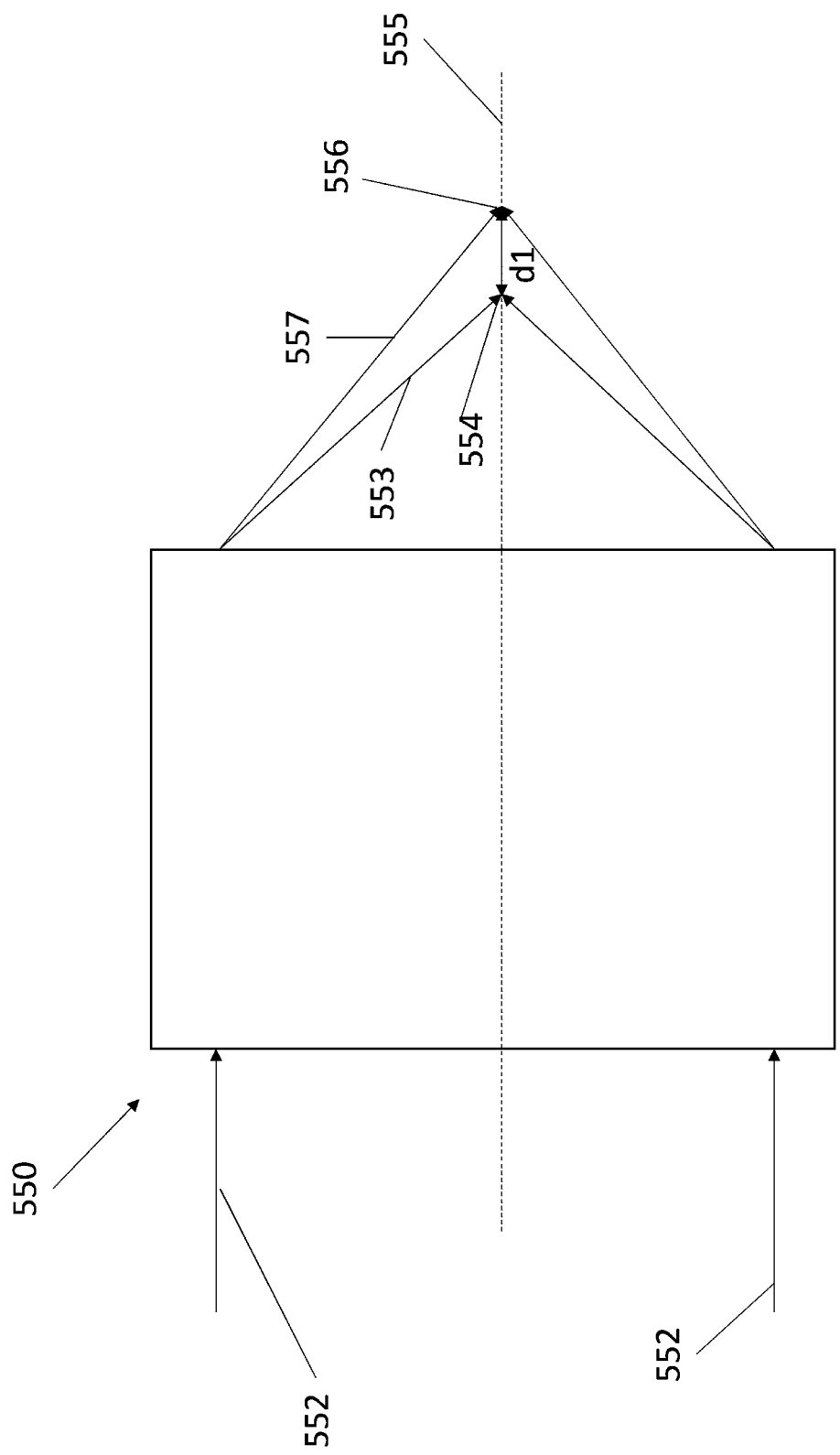

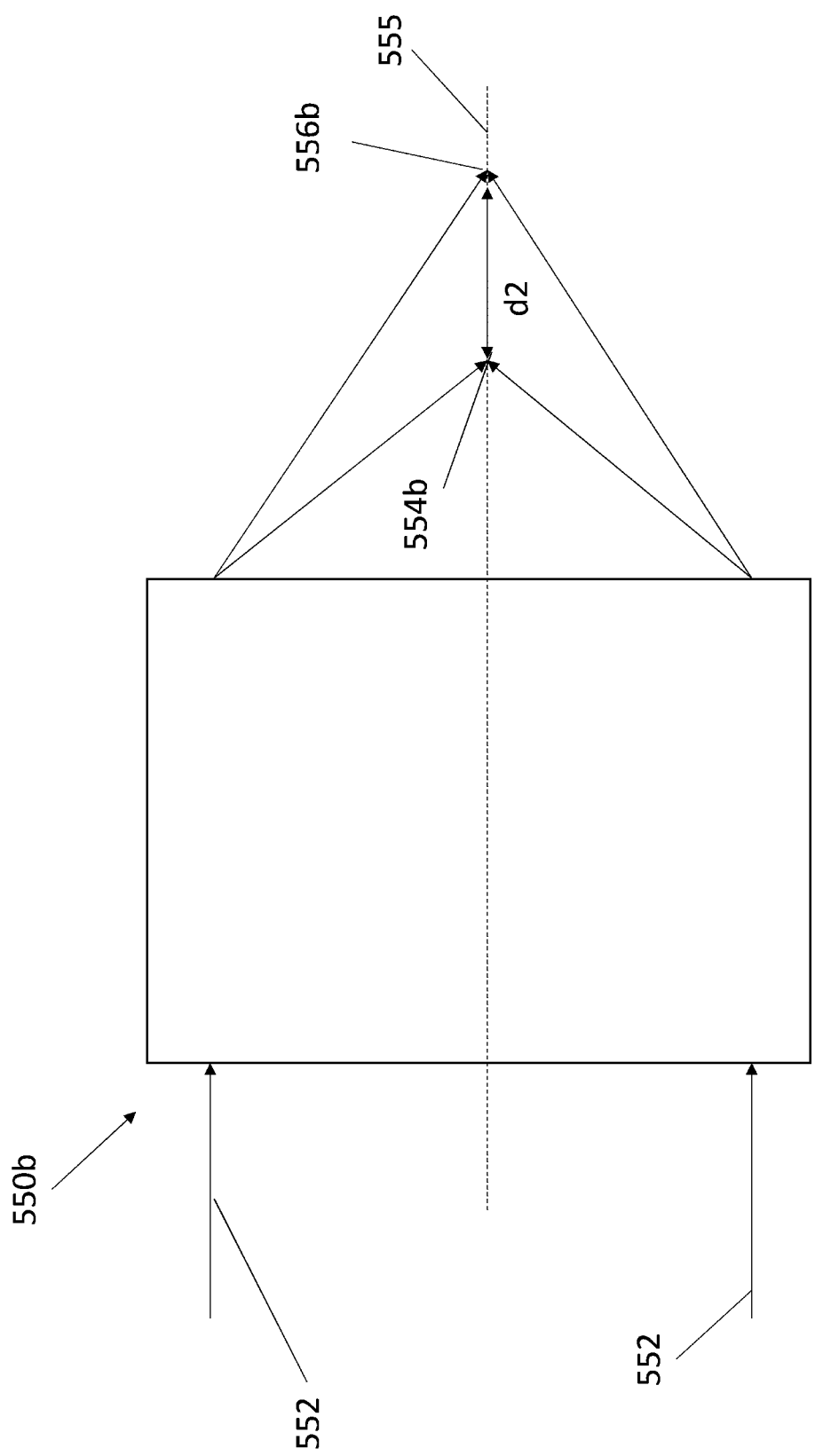

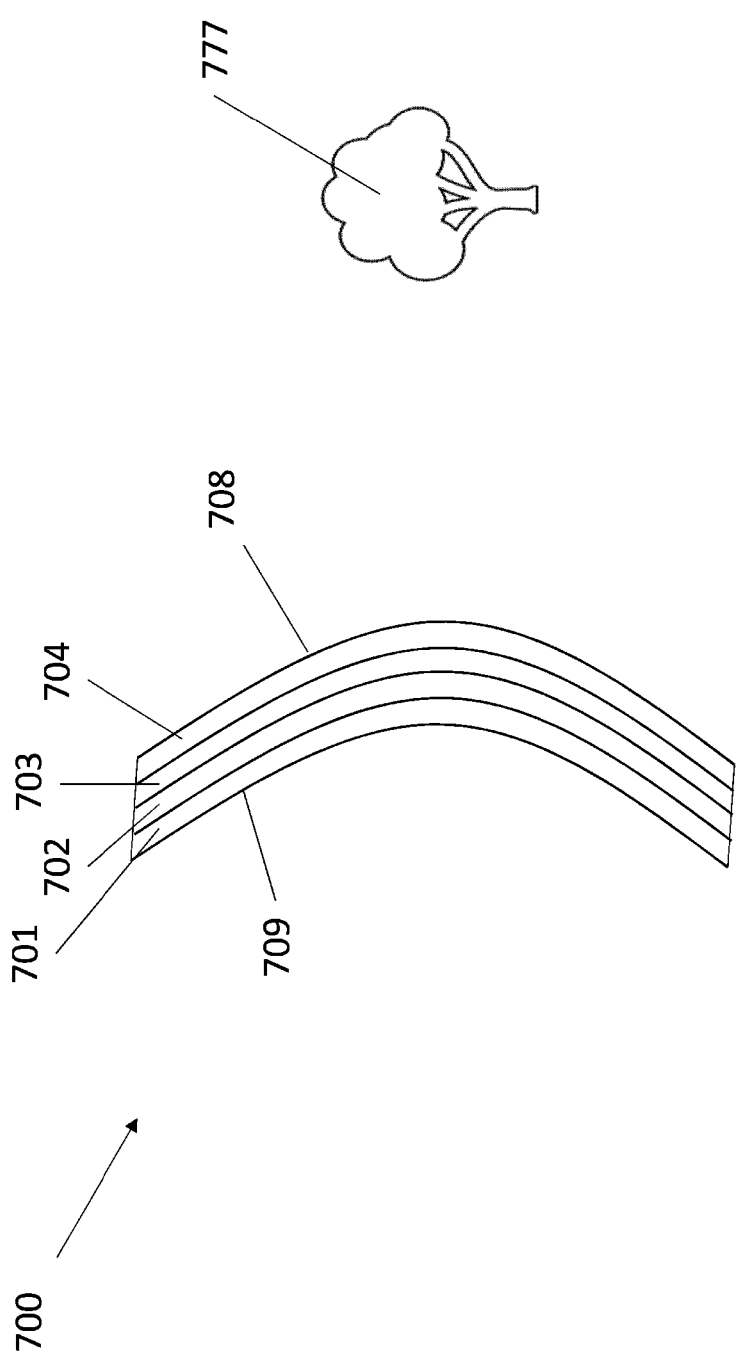

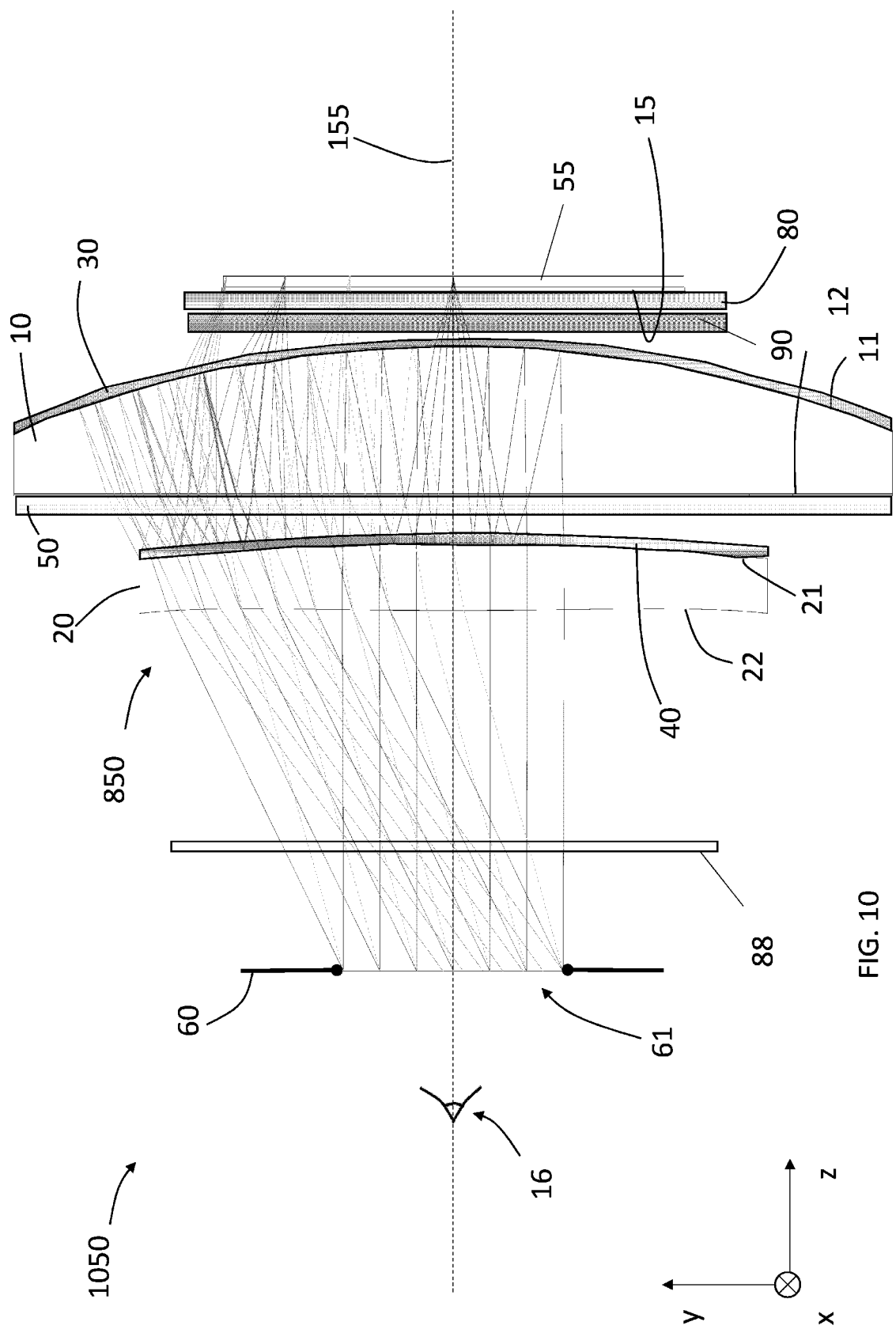

OPTICAL SYSTEM

BACKGROUND

Optical systems may exhibit optical aberrations. Chromatic aberration is an optical aberration in which the lateral or longitudinal focus of light varies with wavelength. In longitudinal color (sometimes called axial color or focal shift), there is a difference in focal plane location for different wavelengths.

SUMMARY

In some aspects of the present description, an optical system for displaying an image to a viewer is provided. The optical system includes a first optical lens comprising a curved first major surface; a partial reflector disposed on and conforming to the curved first major surface of the first optical lens and having an average optical reflectance of at least 30% for each of a first, second and third color light; a second optical lens comprising a curved first major surface; an integral reflective polarizer disposed on and conforming to the curved first major surface of the second optical lens. The integral reflective polarizer includes a first plurality of sequentially arranged interference layers configured to reflect the first color light having a first polarization state, transmit the first color light having an orthogonal second polarization state, and transmit the second and third color lights for each of the first and second polarization states; a second plurality of sequentially arranged interference layers separated from the first plurality of interference layers by one or more first non-interference layers having a total first thickness, where the second plurality of interference layers are configured to reflect the second color light having the first polarization state, transmit the second color light having the second polarization state, and transmit the first and third color lights for each of the first and second polarization states; and a third plurality of sequentially arranged interference layers separated from the second plurality of interference layers by one or more second non-interference layers having a total second thickness, where the third plurality of interference layers are configured to reflect the third color light having the first polarization state, transmit the third color light having the second polarization state, and transmit the first and second color lights for each of the first and second polarization states. Each interference layer in the first, second and third pluralities of interference layers reflect or transmit light primarily by optical interference. Each first and second non-interference layer does not reflect or transmit light primarily by optical interference. The second plurality of interference layers is disposed between the first and third pluralities of interference layers. Changing each of the first and second thicknesses by 10% increases a magnitude of a chromatic aberration of the optical system by at least 20%.

In some aspects of the present description, an optical imaging system for displaying an image to a viewer is provided. The optical imaging system includes a reflective polarizer including first and second reflection zones, such that for light substantially normally incident on the reflective polarizer, the first zone substantially reflects light in a first wavelength range and substantially transmits light in a different non-overlapping second wavelength range, and the second zone substantially reflects light in the second wavelength range and substantially transmits light in the first wavelength range. The first and second reflection zones have first and second thicknesses having corresponding first and second mid-points separated by a distance d, such that a longitudinal chromatic aberration of the optical imaging system of the first wavelength range to the second wavelength range caused when reducing d so that the first and second reflection zones are immediately adjacent is a distance h, $0.3h \leq d \leq 0.7h$.

In some aspects of the present description, an optical imaging system for displaying an image of an object to a viewer is provided. The optical imaging system includes a reflective polarizer having opposing first and second major surfaces, where the first major surface faces the object. The optical imaging system has a first longitudinal chromatic aberration d1 of a first color wavelength to a second color wavelength, such that reversing the reflective polarizer so that the second major surface faces the object results in the optical imaging system having a second longitudinal chromatic aberration d2 of the first color wavelength to the second color wavelength, where d2 is greater than d1.

In some aspects of the present description, an optical imaging system for displaying an image of an object to a viewer is provided. The optical imaging system includes a reflective polarizer having a first major surface facing the object and a plurality of polymeric interference layers numbering at least 50 and reflecting and transmitting light primarily by optical interference in a predetermined wavelength range extending at least from 400 to 600 nm. Reversing the reflective polarizer so that the first major surface faces away from the object increases a longitudinal chromatic aberration of the optical imaging system in the predetermined wavelength range by at least 20%.

BRIEF DESCRIPTION OF THE DRAWINGS

FIG. 2 is a schematic cross-sectional view of a plurality of interference layers;

FIGS. 3-4 are a schematic cross-sectional views of non-interference layers;

FIGS. 5A-5B are schematic cross-sectional views of optical systems;

FIGS. 6A-7B are schematic cross-sectional views of reflective polarizers; and

FIGS. 8-10 are schematic cross-sectional views of optical systems.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some embodiments of the present description, it has been found that in an optical system including a reflective polarizer, residual longitudinal color in the system can be balanced by chromatic optical path length differences resulting from choosing a suitable multilayer reflective polarizer. Choosing a suitable reflective polarizer can include choosing an appropriate separation between a set of interference layers of the reflective polarizer reflecting red wavelengths and a set of interference layers of the reflective polarizer reflecting blue wavelengths, for example. The appropriate separation between the sets of interference layers can be achieved by changing the layer thickness profile of the reflective polarizer to achieve the desired separation and/or including non-interference layers between the sets of interference layers to space them apart and/or. The optical systems of the present description typically provide a folded optical path. Folded optics systems are described in U.S. Pat. No. 9,557,568 (Ouderkirk et al.), for example.

Figure 1:
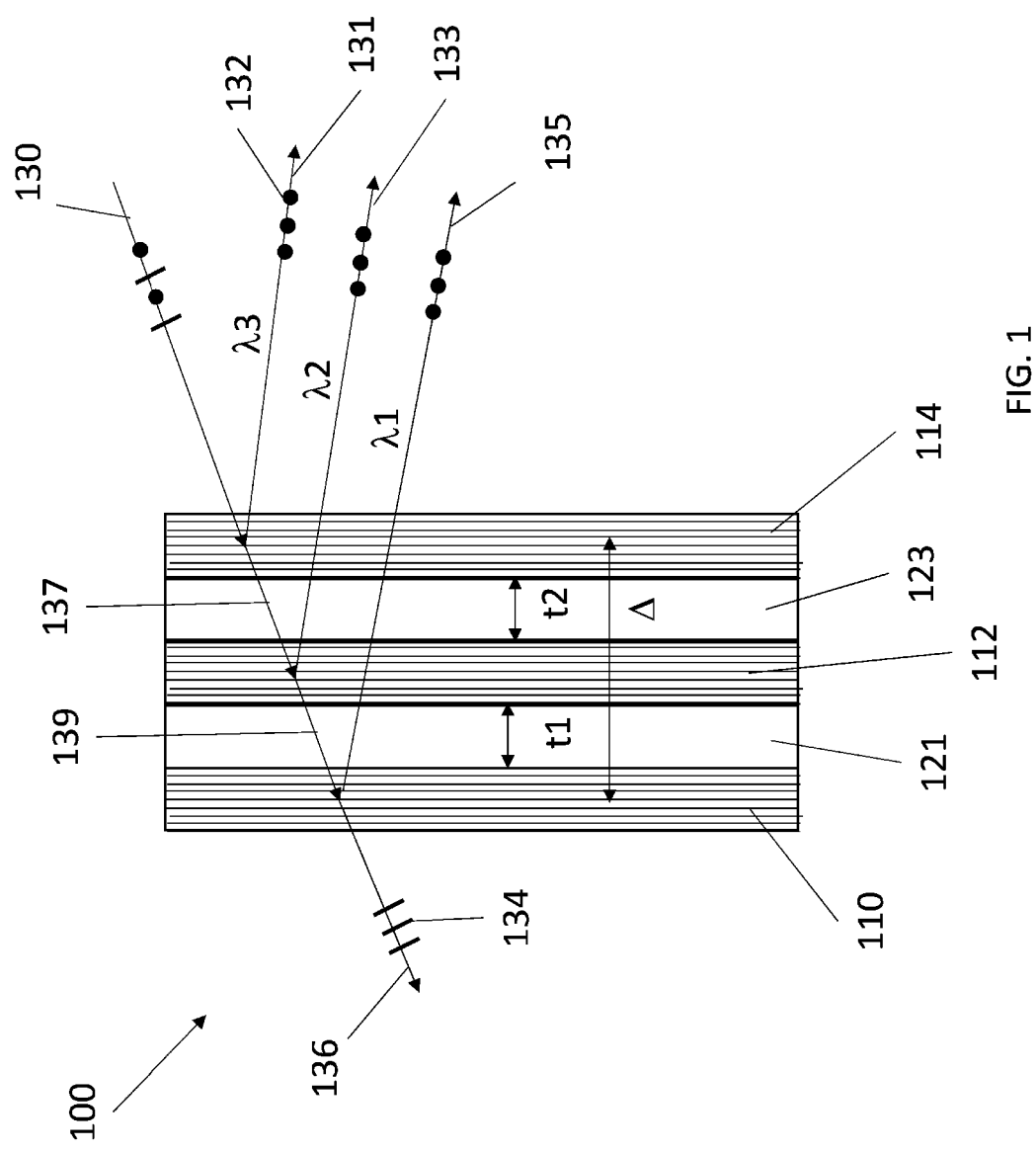
FIG. 1 is a schematic cross-sectional view of a reflective polarizer.

FIG. 1 is a schematic illustration of reflective polarizer 100 including a first plurality of sequentially arranged interference layers 110, a second plurality of sequentially arranged interference layers 112, and a third plurality of sequentially arranged interference layers 114. The second plurality of interference layers 112 is separated from the first plurality of interference layers 110 by one or more first non-interference layers 121 having a total first thickness t1. The third plurality of interference layers 114 is separated from the second plurality of interference layers 112 by one or more second noninterference layers 123 having a total second thickness t2. A distance Δ between mid-points of the first and third pluralities of interference layers 110 and 114 is illustrated. The first plurality of interference layers 110 is configured to reflect a first color (e.g. red) light having a first polarization state 132, transmit the first color light having an orthogonal second polarization state 134, and transmit second (e.g., green) and third (e.g., blue) color lights for each of the first and second polarization states 132 and 134. The second plurality of interference layers 112 is configured to reflect the second color light having the first polarization state 132, transmit the second color light having the second polarization state 134, and transmit the first and third color lights for each of the first and second polarization states 132 and 134. The third plurality of interference layers 114 is configured to reflect the third color light having the first polarization state 132, transmit the third color light having the second polarization state 134, and transmit the first and second color lights for each of the first and second polarization states 132 and 134. In some embodiments, each interference layer in the first, second and third pluralities of interference layers 110, 112 and 114 has a thickness less than 200 nm. In some embodiments, each of t1 and t2 is greater than 1 micrometer.

In some embodiments, the first color light has wavelengths $\lambda 1$ in a red range (e.g., greater than 600 nm and no more than 700 nm, or 625 nm to 675 nm). In some embodiments, the second color light has wavelengths $\lambda 2$ in a green range (e.g., 600 nm to 700 nm, or 625 nm to 675 nm). In some embodiments, the third color light has wavelengths $\lambda 3$ in a blue range (e.g., at least 400 nm and less than 500 nm, or 425 nm to 475 nm). In some embodiments, an optical system including the reflective polarizer 100 includes a pixelated display having subpixels with at least three different colors. The first, second and third color lights may be lights from three differently colored subpixels.

Light 130 includes the first, second and third color lights and includes the first and second polarization states 132 and 134. A portion of light 130 is reflected by the third plurality of interference layers 114 as light 131 and a portion of light 130 is transmitted through the third plurality of interference layers 114 as light 137. Light 131 has the third color wavelengths $\lambda 3$ and the first polarization state 132. Light 137 includes the third color light having the second polarization state 134 and includes the first and second color lights for each of the first and second polarization states 132 and 134. A portion of light 137 is reflected by the second plurality of interference layers 112 as light 133 and a portion of light 137 is transmitted through the second plurality of interference layers 112 as light 139. Light 133 is transmitted through the third plurality of interference layers 114 and has the second color wavelengths $\lambda 2$ and the first polarization state 132. Light 139 includes the first color light having the first polarization state 132 and includes the first, second and third color lights for the second polarization state 134. A portion of light 139 is reflected by the first plurality of interference layers 110 as light 135 and a portion of light 139 is transmitted through the first plurality of interference layers 110 as light 136. Light 135 is transmitted through the second and third pluralities of interference layers 112 and 114, and has the third color wavelengths $\lambda 3$ and the first polarization state 132. Light 136 includes the first, second and third color lights having the second polarization state 134.

FIG. 2 is a schematic cross-sectional view of a plurality of interference layers 210 which may correspond to any one of the first, second and third pluralities of interference layers 110, 112 and 114. The plurality of interference layers 210 includes alternating first and second polymeric layers 241 and 242 reflecting and transmitting light primarily by optical interference. In some embodiments, each of the first and second polymeric layers 241 and 242 have a thickness less than about 200 nm. In some embodiments, the thickness of the polymeric layers 241 and 242 vary (e.g., monotonically) across a thickness of the plurality of interference layers 210 in order to produce reflection in a desired wavelength range. In some embodiments, an integrally formed optical stack includes the plurality of interference layers 210 and optionally includes a non-interference layer on one or both sides of the plurality of interference layers 210. The non-interference layer(s) may be skin layer(s) or protective boundary layer(s), for example.

As used herein, a first element "integrally formed" with a second element means that the first and second elements are manufactured together rather than manufactured separately and then subsequently joined. Integrally formed includes manufacturing a first element followed by manufacturing the second element on the first element. A reflective polarizer including a plurality of layers is integrally formed if the layers are manufactured together (e.g., combined as melt streams and then cast onto a chill roll to form a cast film having each of the layers, and then orienting the cast film) rather than manufactured separately and then subsequently joined. An integrally formed reflective polarize may also be referred to as an integral reflective polarizer.

The reflective polarizer 100 and other reflective polarizers of the present description can be made using conventional multilayer film processing techniques such as those described in U.S. Pat. No. 5,882,774 (Jonza et al.), and U.S. Pat. No. 6,609,795 (Weber et al.), for example. The fabrication method may include: (a) providing at least a first and a second stream of resin corresponding to the first and second polymeric layers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce the near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). Unconstrained stretching may be utilized to provide substantially uniaxially oriented multilayer optical films as described in U.S. Pat. No. 2010/0254002 (Merrill et al.). Alternatively, the film may be stretched in a batch process. In any case, subsequent or concurrent draw reduction, stress or strain equilibration, heat setting, and other processing operations can also be applied to the film.

A reflective polarizer may be said to substantially reflect light having a first polarization state in a predetermined wavelength range if at least 60 percent of light having the first polarization state in the predetermined wavelength at normal incidence is reflected from the reflective polarizer. In some embodiments, at least 70 percent, or at least 80 percent, of light at normal incidence having the first polarization state and the predetermined wavelength is reflected from the reflective polarizer. A reflective polarizer may be said to substantially transmit light having a second polarization state in a predetermined wavelength range if at least 60 percent of normally incident light having the second polarization state in the predetermined wavelength range is transmitted through the polarizer. In some embodiments, at least 70 percent, or at least 80 percent, of normally incident light having the second polarization state in the predetermined wavelength range is transmitted through the reflective polarizer.

A non-interference layer does not reflect and transmit light primarily by optical interference and is typically optically thick (i.e., having a thickness substantially larger than a wavelength in a predetermined wavelength range such as 400 nm to 700 nm). The non-interference layers of the optical stack may be exterior layers of the optical film, or may be layers within the one or more first non-interference layers 121 or 123, for example. In some embodiments, a non-interference layer, or a stack of more than one non-interference layer, has a thickness (e.g., t1 or t2) greater than about 1 micrometer, or greater than about 2 micrometers, or greater than about 2 times a largest wavelength in the predetermined wavelength range, or greater than about 3 times a largest wavelength in the predetermined wavelength range.

FIG. 3 is a schematic cross-sectional view of one or more non-interference layers 321 which may correspond to the one or more non-interference layers 121 or 123, for example. In the illustrated embodiment, the one or more non-interference layers 321 includes first and second non-interference layers 345 and 347. In other embodiments, only one non-interference layer is included or three or more non-interference layers are included. The first and second non-interference layers 345 and 347 may be skin layers of adjacent optical stacks, for example.

FIG. 4 is a schematic cross-sectional view of one or more non-interference layers 421 which may correspond to the one or more non-interference layers 121 or 123, for example. The one or more non-interference layers 421 includes first and second outer non-interference layers 445 and 447 and inner spacer non-interference layer 449. The first and second outer non-interference layers 445 and 447 may be skin layers of adjacent optical stacks, for example, and the inner spacer non-interference layer 449 may be included to increase the overall thickness (e.g., corresponding to t1 or t2) of the one or more non-interference layers 421.

Alternatively or in addition, a center-to-center distance Δ between the first and third pluralities of interference layers 110 and 114 can be adjusted by a selection of layer thickness provide of the interference layers and the refractive index difference between immediately adjacent interference layers. Pairs of immediately adjacent interference layers reflect light having a wavelength twice the total optical thickness (refractive index times physical thickness) of the pair with the reflectivity depending on the refractive index difference between the adjacent layers. Utilizing a relatively large refractive index difference allows relatively fewer interference layers to be utilized to achieve a desired reflectivity over a desired wavelength range and this can result in a smaller center-to-center separation between the first and third pluralities of interference layers 110 and 114. Similarly, a relatively small refractive index difference can be utilized to achieve a desired reflectivity over a desired wavelength range when relatively more interference layers are used and this can result in a larger center-to-center separation between the first and third pluralities of interference layers 110 and 114.

In some embodiments, an optical system includes a reflective polarizer and has a chromatic aberration (e.g., longitudinal chromatic aberration) that changes in some specified way when the reflective polarizer is changed in some specified way.

FIG. 5A is a schematic illustration of an optical system 550 receiving a collimated input light 552 having wavelengths in a predetermined wavelength range. The optical system focuses each wavelength of the input light 552 to a point on an optical axis 555 of the optical system 550 between first and second points 554 and 556. For example, a first light ray 553 having a first wavelength is focused to first point 554 and a second light ray 557 having a second wavelength is focused to the second point 556. In some embodiments, one of the first and second wavelengths is a shortest wavelength in the predetermined wavelength range and the other of the first and second wavelengths is a longest wavelength in the predetermined wavelength range. The distance d1 between the first and second points 554 and 556 is the longitudinal chromatic aberration, also known as the axial chromatic aberration, of the optical system 550. The optical system 550 includes a reflective polarizer (not illustrated in FIG. 5) as described further elsewhere herein.

FIG. 5B is a schematic illustration of an optical system 550b which is otherwise equivalent to optical system 550 but where the reflective polarizer of optical system 550 has been modified as described further elsewhere herein (e.g., changing a distance between interference layers or reversing the reflective polarizer). The optical system 550b has a longitudinal chromatic aberration of d2. The distance d2 may be referred to as the longitudinal chromatic aberration of the optical system caused when modifying the reflective polarizer and may also be denoted as h.

In some embodiments, the longitudinal chromatic aberrations d1 and d2 are specified for specific wavelengths. For example, in some embodiments, d1 and d2 may be described as longitudinal chromatic aberrations of the first color wavelength to the second color wavelength. In some embodiments, the longitudinal chromatic aberrations d1 and d2 are specified for specific wavelength ranges. For example, in some embodiments, d1 and d2 may be described as a longitudinal chromatic aberration of a first wavelength range to a second wavelength range. In this case, the longitudinal chromatic aberrations d1 and d2 refer to the largest longitudinal chromatic aberrations for wavelengths in the specified ranges. For example, in FIG. 5A, the light ray 553 and light ray 557 may have wavelengths in the first and second wavelength ranges, respectively, which results in the largest d1. Similarly, in FIG. 5B, the corresponding light ray may have wavelengths in the respective first and second wavelength ranges that result in the largest d2. It is often the case that the longitudinal chromatic aberration is a monotonic function of the wavelength so that the longitudinal chromatic aberration for a specified wavelength range is the absolute value of the difference between the longitudinal chromatic aberration at the longest wavelength and the longitudinal chromatic aberration at the shortest wavelength in the specified wavelength range.

In some embodiments, d2 is greater than d1, or d2 is at least 1.2 times d1 (i.e., d2 may be increased from d1 by at least 20%), or at least 1.5 times d1, or at least 1.75 times d1, or at least 2 times d1, or at least 2.5 times d1, or at least 3 times d1, or at least 3.5 times d1, or at least 4 times d1.

In some embodiments, the reflective polarizer of FIG. 5A is the reflective polarizer 100 and the modification to the reflective polarizer referred to above is changing the first and second separation distances t1 and t2 by 10%. In some embodiments, the first and second separation distances are both increased by 10%. In some embodiments, the first and second separation distances are both decreased by 10%. In some embodiments, this increases a magnitude of a chromic aberration (e.g., the longitudinal chromatic aberration) of the optical system by at least 20%, or at least 30%, or at least 40%, or at least 50%. In some embodiments, the reflective polarizer includes first and second pluralities of interference layers having respective first and second mid-points and the modification to the reflective polarizer referred to above is changing a distance (in some embodiments, increasing and in some embodiments, decreasing) between the first and second mid-points by 10%. For example, the first and second pluralities of interference layers referred to here may correspond to the first and third pluralities of interference layers 110 and 114 depicted in FIG. 1 and the distance between first and second mid-points may correspond to the distance Δ depicted in FIG. 1. As another example, the first and second pluralities of interference layers referred to here may correspond to the first and second reflection zones 643 and 644 depicted in FIG. 6A and the distance between first and second mid-points may correspond to the distance d depicted in FIG. 6A. In some embodiments, this increases a magnitude of the longitudinal chromatic aberration) of the optical system by at least 20%, or at least 30%, or at least 40%, or at least 50%.

Figure 6A:
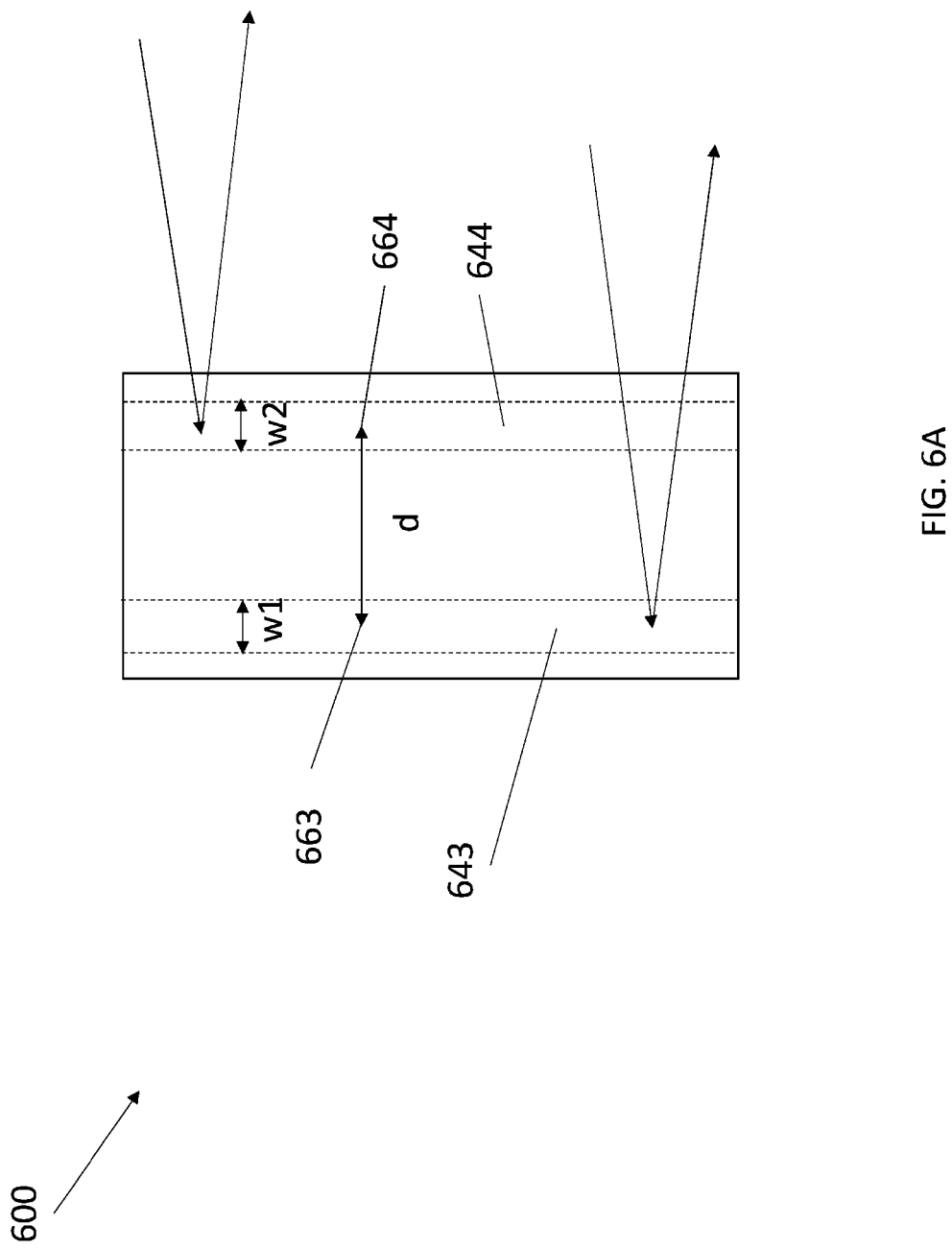

In some embodiments, the modification to the reflective polarizer referred to above is changing the distance between first and second reflection zones (e.g., by 10% or by reducing the distance until the first and second reflection zones are immediately adjacent). FIG. 6A is a schematic illustration of a reflective polarizer 600 having such first and second reflection zones 643 and 644. In some embodiments, the first and second reflection zones 643 and 644 are such that for light substantially normally incident on the reflective polarizer, the first reflection zone 643 substantially reflects light in a first wavelength range and substantially transmits light in a different non-overlapping second wavelength range, and the second reflection zone 644 substantially reflects light in the second wavelength range and substantially transmits light in the first wavelength range. For example, the first reflection zone 643 may correspond to the first plurality of interference layers 110 and the first wavelength range may correspond to the wavelength range of the first color light (wavelengths $\lambda 1$). Similarly, the second reflection zone 644 may correspond to the third plurality of interference layers 114 and the second wavelength range may correspond to the wavelength range of the third color light (wavelengths $\lambda 3$), for example. The region between the first and second reflection zones 643 and 644 may include an additional reflection zone (e.g., a third reflection zone corresponding to the second plurality of interference layers 112) and/or may include one or more non-interference layers (e.g., non-interference layer(s) 121 and/or 123). In some embodiments, the first and second reflection zones and any additional reflection zones reflect light in the corresponding wavelength range having a first polarization state and transmit light in each of the wavelength ranges for light having an orthogonal second polarization state.

The first and second reflection zones 643 and 644 have first and second thicknesses w1 and w2 having corresponding first and second mid-points 663 and 664 (points mid-way along the thickness direction) separated by a distance d.

Figure 6B:
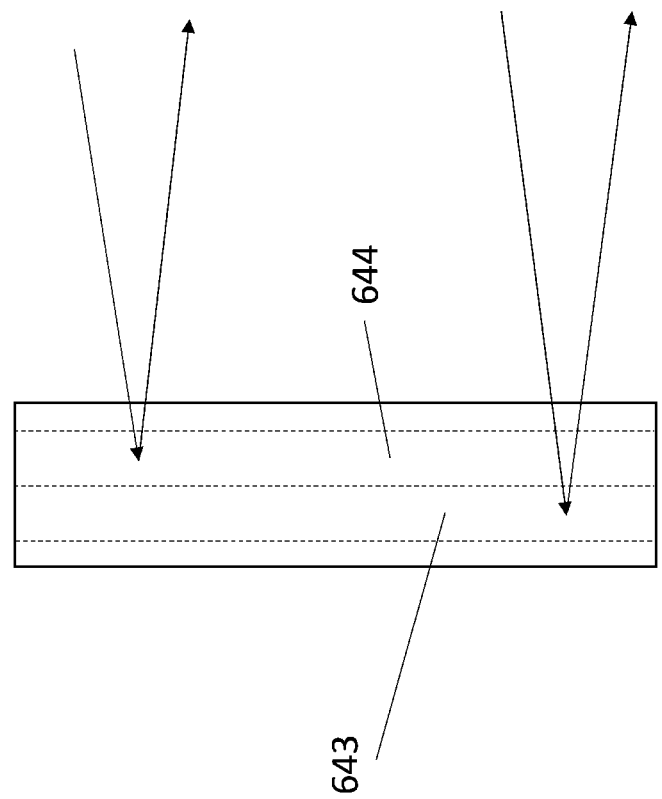

FIG. 6B is a schematic illustration of a reflective polarizer 600b which results from reducing the distance d of reflective polarizer 600 so that the first and second reflection zones 643 and 644 are immediately adjacent.

In some embodiments, an optical imaging system including the reflective polarizer 600 has a longitudinal chromatic aberration of the first wavelength range to the second wavelength range caused when reducing d so that the first and second reflection zones are immediately adjacent is a distance h, where $0.3h \leq d \leq 0.7h$, or $0.35h \leq d \leq 0.65h$, or $0.4h \leq d \leq 0.6h$. For example, in the optical system modeled in the Example, the longitudinal chromatic aberration from about 486 nm to about 656 nm was about 82 micrometers when the separation between the first and second reflection zones were reduced to zero. In this case, the reflective polarizer can reflect the 486 nm wavelength from a first reflection zone consisting of a first pair of immediately adjacent interference layers having a total optical thickness of about 243 nm and the reflective polarizer can reflect the 656 nm wavelength from a second reflection zone consisting of a second pair of immediately adjacent interference layers having a total optical thickness of about 328 nm. Changing the spacing d between the mid-points of the first and second pairs from 40 micrometers until the pairs are immediately adjacent can be approximated by reducing d from 40 micrometers to zero since the thickness of the first and second pairs are small compared to 40 micrometers. The longitudinal chromatic aberration was about 24 micrometers when d was 40 micrometers and was about 82 micrometers when reducing d to 0. In this case, d=40 micrometers and h≈82 micrometers and so d≈0.49 h.

Figure 7B:
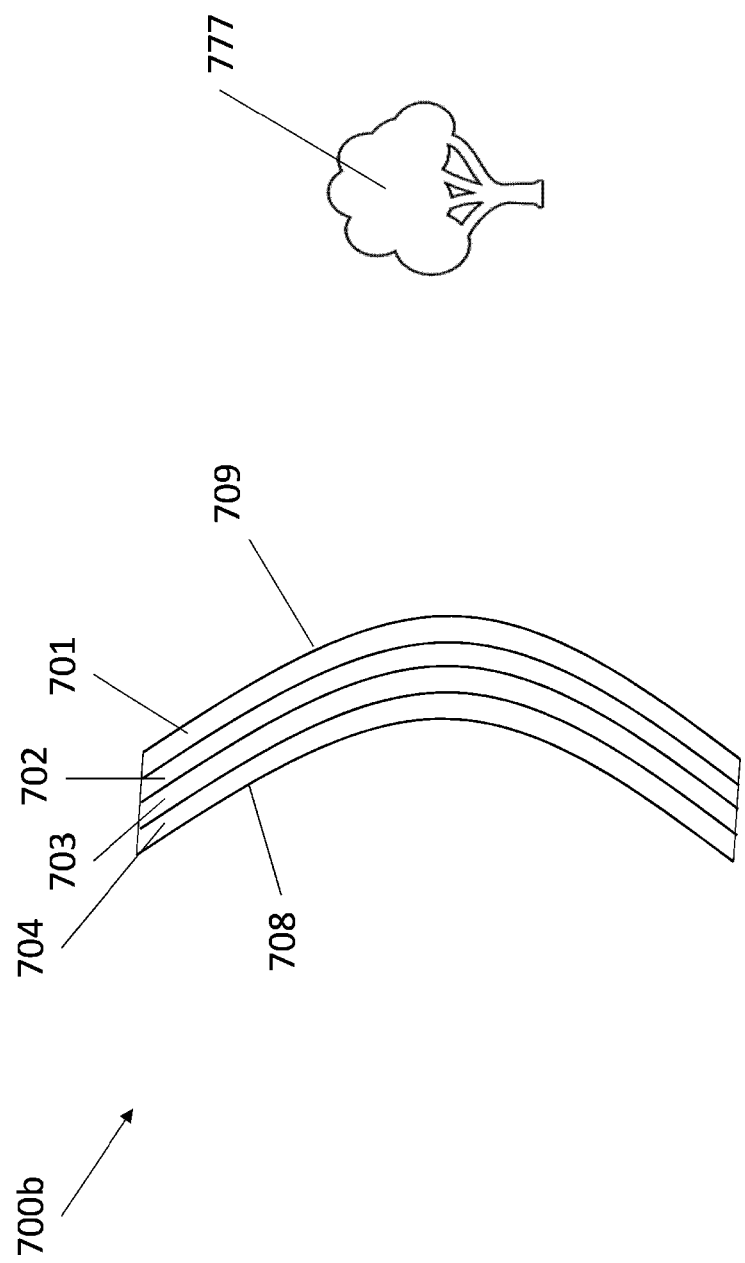

In some embodiments, the modification to the reflective polarizer referred to above is reversing the reflective polarizer. Reversing the reflective polarizer can be described as reversing the layer order (e.g., from 1 to N to from N to 1) and layer orientation (so that interfaces between adjacent layers remain the same interface and so that one outermost major surface is exchanged with the other outermost major surface) while keeping the shape of the reflective polarizer unchanged. This is illustrated in FIGS. 7A-7B. FIG. 7A is a schematic illustration of reflective polarizer 700 having first and second major surfaces 708 and 709 where the first major surface 708 faces an object 777. The object 777 may be displayed by an imager, for example, when the reflective polarizer 700 is used in an optical imaging system for displaying an image of an object to a viewer. Reflective polarizer 700 is schematically shown with four layers 701, 702, 703, and 704 for ease of illustration, but will typically include at least 50 layers (e.g., 50 to 1200 interference layers, or 100 to 1000 interference layers). FIG. 7B is a schematic illustration of reflective polarizer 700b which results from reversing the reflective polarizer 700 so that the second major surface 709 faces the object 777.

In some embodiments, the optical system is an optical imaging system for displaying an image of an object to a viewer, and the reflective polarizer has opposing first and second major surfaces with the first major surface facing the object. In some embodiments, the optical imaging system has a first longitudinal chromatic aberration d1 of a first color wavelength to a second color wavelength, such that reversing the reflective polarizer so that the second major surface faces the object results in the optical imaging system having a second longitudinal chromatic aberration d2 of the first color wavelength to the second color wavelength, where d2>d1. In some embodiments, d2 is at least 1.2 times d1, or at least 1.5 times d1, or at least 1.75 times d1, or at least 2 times d1, or at least 2.5 times d1, or at least 3 times d1, or at least 3.5 times d1, or at least 4 times d1, or at least 4.5 times d1, or at least 5 times d1. In some embodiments, an optical imaging system for displaying an image of an object to a viewer includes a reflective polarizer having a first major surface facing the object and a plurality of polymeric interference layers numbering at least 50 and reflecting and transmitting light primarily by optical interference in a predetermined wavelength range extending at least from 400 to 600 nm, such that reversing the reflective polarizer so that the first major surface faces away from the object increases a longitudinal chromatic aberration of the optical imaging system in the predetermined wavelength range by at least 20%, or at least 50%, or at least 75%, or at least 100%, or at least 150%, or at least 200%, or at least 250%, or at least 300%, or at least 350%, or at least 400%. For example, the optical system of the Example had a d1 of about 24 micrometers and a d2 of about 141 micrometers so that d2 was about 5.9 times d1, or, equivalently, d2 was increased from d1 by about 490% ((141 μm−24 μm)/24 μm*100%).

Figure 8:
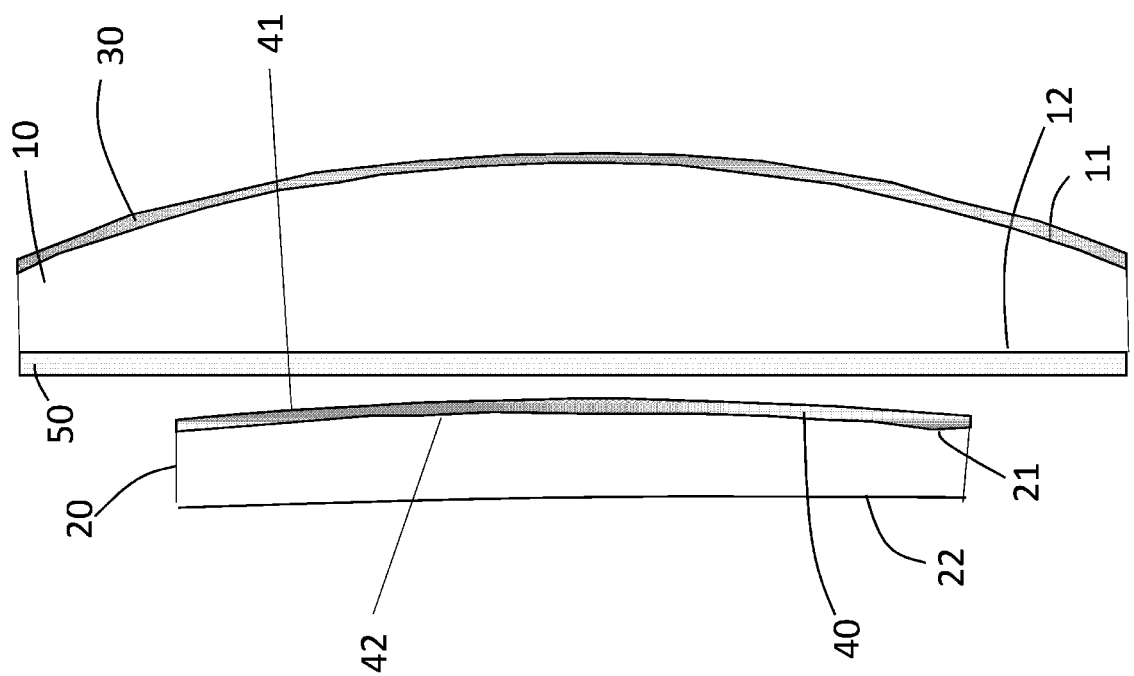

FIG. 8 is a schematic illustration of an optical system 850 including a first optical lens 10 having opposing first and second major surfaces 11 and 12; a partial reflector 30 disposed on and conforming to the first major surface 11 of the first optical lens 10; a second optical lens 20 having opposing first and second major surfaces 21 and 22; and a reflective polarizer 40 disposed on and conforming to the first major surface 21 of the second optical lens 20. In some embodiments, the first major surface 11 of the first optical lens 10 is curved. In some embodiments, the first major surface 21 of the second optical lens 20 is curved. For example, the first major surface 11 and/or the first major surface 21 may have at least one location having a radius of curvature in each of two orthogonal directions in a range of 6 mm to 1000 mm. In the illustrated embodiments, a retarder 50 is disposed on the second major surface 12 of the first optical lens 10. In other embodiments, the retarder 50 is included as a separate retarder plate between the first and second lens or is otherwise included at some location between the partial reflector 30 and the reflective polarizer 40.

The partial reflector 30 may have an average optical reflectance of at least 30% in a predetermined wavelength range. In some embodiments, the predetermined wavelength range may comprise a wavelength of about 550 nm, e.g., may comprise the wavelength 587.6 nm. The predetermined wavelength range may extend from about 400 nm to about 600 nm or to about 700 nm in some embodiments. For example, the predetermined wavelength range can include a blue primary color wavelength, a green primary color wavelength, and a red primary color wavelength. The predetermined wavelength range may be any wavelength range over which the optical system is designed to operate. In some embodiments, the predetermined wavelength ranges include other wavelength ranges. For example, infrared (e.g., near infrared (about 700 nm to about 2500 nm)) and/or ultraviolet (e.g., near ultraviolet (about 300 nm to about 400 nm)) wavelengths as well as visible (400 nm to 700 nm) wavelengths may be included in the predetermined wavelength range. In some embodiments, partial reflector 30 has an average optical reflectance of at least 30% for each of a first (e.g., red), second (e.g., green) and third (e.g., blue) color light.

The partial reflector used in any of the optical systems of the present description may be any suitable partial reflector. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refers to the unweighted average over polarizations of the optical reflectance and optical transmittance, respectively, determined at normal incidence unless indicated otherwise. In some embodiments, the partial reflector may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

The retarder 50 may be a quarter-wave retarder for at least one wavelength in a predetermined wavelength range. Alternatively, the retarder 50 may have a retardance of 5/4 or 9/4, for example, of a wavelength in the predetermined wavelength range. The retarder(s) (e.g., retarder 50) used in the optical systems of the present description can be films or coatings or a combination of films and coating. Suitable films include birefringent polymer film retarders such as those available from Meadowlark Optics (Frederick, CO), for example. Suitable coatings for forming a retarder layer include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland).

Optical system 850 may be described as a folded optics system since the partial reflector 30 and the reflective polarizer 40 provide a folded optical path. As described in U.S. Pat. No. 9,557,568 (Ouderkirk et al.), a folded optics system can be used as a camera where an image recorder is positioned to the right of the first optical lens 10 in FIG. 8, or can be used as a display system where a display panel is positioned to the right of the first optical lens 10.

Figure 9:
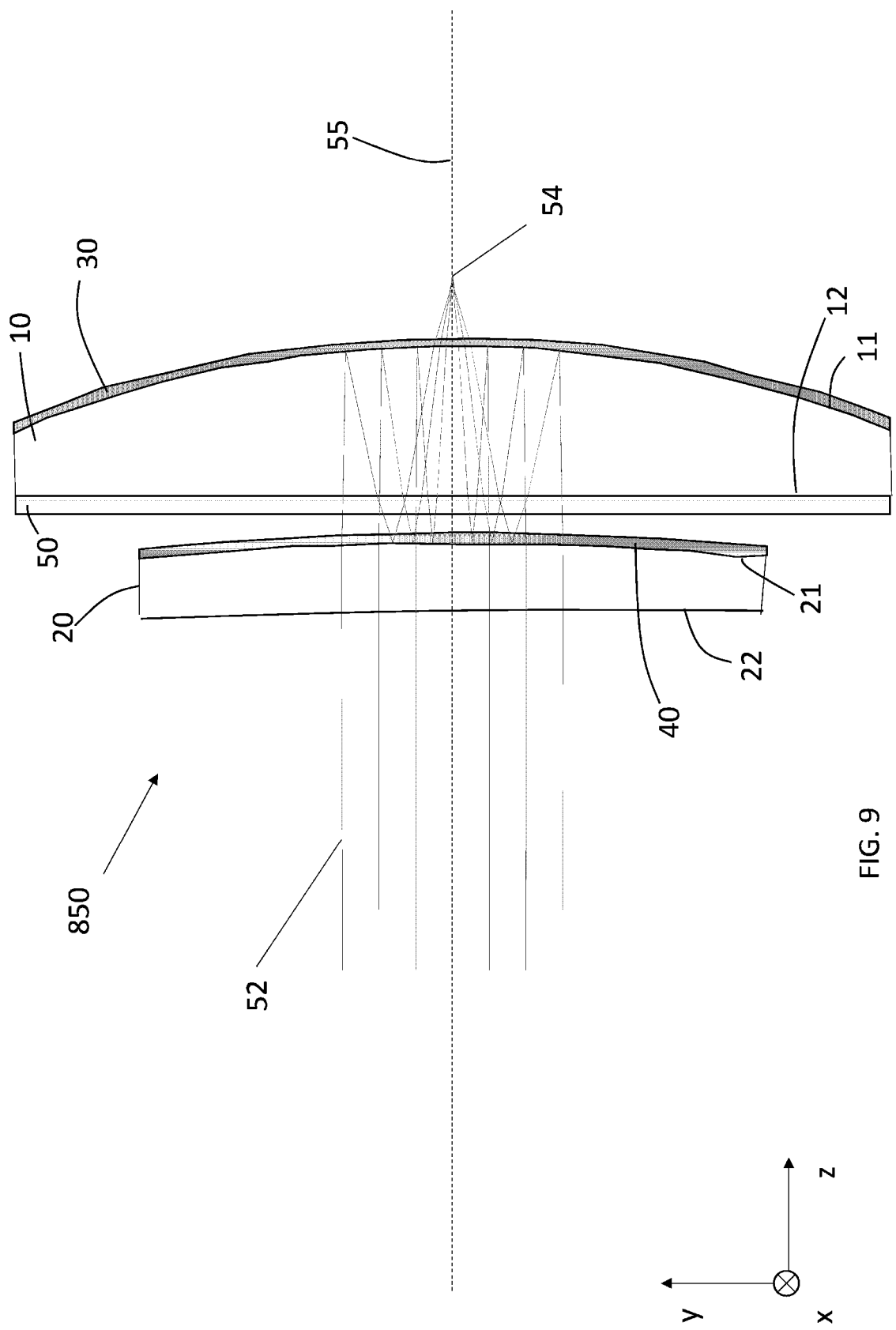

FIG. 9 is a schematic illustration of optical system 850 with a collimated light 52 having the second polarization state incident on the second major surface 22 of the second optical lens 20 of the optical system 850. The collimated light 52 can be used to determine the chromatic aberration of the optical system 850. The collimated light 52 can be prepared using a collimating optical lens and a linear polarizer, for example. In some embodiments, optical system 850 further includes a pupil having an opening therein. In some embodiments, the optical system 850 is used in a display application and the pupil is an exit pupil. In some embodiments, the optical system 850 is used in a camera application, for example, and the pupil is an entrance pupil. Regardless of whether the optical system 850 is used in a display or a camera system, the longitudinal chromatic aberration of the optical system 850 can be determined as schematically illustrated in FIG. 9. When the optical system 850 will be used in a display application, the diameter of the collimated light 52 incident on the optical system 850 in FIG. 9 may be limited to match the diameter of an exit pupil of the optical system 850 as used in a display application.

Collimated light 52 is incident on the optical system 850 having the second polarization state and is transmitted through the reflective polarizer 40 and the retarder 50, is then reflected from the partial reflector 30 and transmitted through the retarder 50, and is then reflected from the reflective polarizer 40 and transmitted through the retarder 50 and partial reflector 30 to a focus point 54. The chromatic aberration of the optical system 850 can be determined using collimated light 52 having differing wavelengths as schematically illustrated in FIGS. 7A-7B.

FIG. 10 is a schematic illustration of optical system 1050 which includes optical system 850 and further includes an imager 55 disposed adjacent to and facing the first optical lens 10. The imager 55 emits the image 15 which is incident on the first optical lens 10. The optical system 1050, which may be referred to as an optical imaging system, displays the image 15 to the viewer 16. An exit pupil 60 is disposed adjacent and facing the second optical lens 20 and defines an opening 61 therein. The image 15 incident on the first optical lens 10 exits the optical system 1050 through the opening 61 in the exit pupil 60. The optical system 1050 further include a first linear absorbing polarizer 80, a second retarder 90, and a second linear absorbing polarizer 88. The first optical lens 10 is disposed between the second optical lens 20 and the second retarder 90. The second retarder 90 (e.g., a second quarter-wave retarder) is disposed between the first optical lens 10 and the first linear absorbing polarizer 80. The second optical lens 20 is disposed between the second linear absorbing polarizer 88 and the reflective polarizer 40.

In some embodiments, the second retarder 90 and/or the first linear absorbing polarizer 80 may be omitted or may be incorporated into the imager 55. In some embodiments, the second linear absorbing polarizer 88 is omitted or is disposed on the second major surface of the second optical lens 20, for example.

The optical system 1050 is configured such that a light ray propagating along the optical axis 155 passes through the first and second optical lenses 10 and 20, the partial reflector 30, the reflective polarizer 40, and the retarder 50 without being substantially refracted. In some configurations, at least one of the first and second optical lenses 10 and 20, the partial reflector 30, the reflective polarizer 40, and the retarder 50 is rotationally symmetric. In some configurations, at least one of the first and second optical lenses 10 and 20, the partial reflector 30, the reflective polarizer 40, and the retarder 50 is non-rotationally symmetric. In some configurations, at least one of the first and second optical lenses 10 and 20, the partial reflector 30, the reflective polarizer 40, and the retarder 50 has at least one plane of symmetry.

The optical axis of an optical system or a display system or an optical lens or optical element in an optical system can be understood as an axis near the center of the system or a lens or optical element where a light ray propagating along the optical axis passes through the lenses and/or optical element(s) with a low or minimum degree of refraction so that light propagating along axes different from the optical axis experience greater degrees of refraction. In some embodiments, each of the lenses is centered on an optical axis through an apex of each of the lenses. The light ray along the optical axis may pass through the lenses and/or optical element(s) without being refracted or without being substantially refracted. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. In some embodiments, the optical axis of an optical system is an axis such that a light ray propagating along the axis passes through the optical lenses, the partial reflector, the reflective polarizer and the retarder layer(s) without being substantially refracted. In some embodiments, a light ray propagating along the axis passes through the optical lenses, the partial reflector, the reflective polarizer and the retarder layer(s) without being refracted by more than 10 degrees, or more than 5 degrees, or more than 3 degrees, or more than 2 degrees at any major surface of the optical system.

The first and second optical lenses 10 and 20, of the optical system 850 may be made of any suitable material such as glass or plastic. The first optical lens 10 may comprise one or more of a borosilicate BK7 glass, a lanthanum crown LAK34, a lanthanum flint LAF7 glass, a flint F2 glass, a dense flint SF2, a lanthanum dense flint LASF45, and a fluorophosphate FPL51 and a fluorophosphate FPL55 glass. The second optical lens 20 may be made of plastic and may comprises one or more of polymethylmethacrylate (PMMA), a polystyrene, a polyvinyl alcohol, and a polycarbonate. In some embodiments, the first optical lens 10 is a monolithic glass element. In some embodiments, the second optical lens 20 is a monolithic plastic element.

In some embodiments, the imager 55 is a liquid crystal display panel or an organic light emitting diode (OLED) display panel.

Terms such as "about" and "substantially" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 5 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.95 and 1.05, and that the value could be 1. If the use of "substantially normal" is not otherwise clear to one of ordinary skill in the art in the context in which it is used and described in the present description, "substantially normal" will mean within 30 degrees of normal. Directions described as substantially normal may, in some embodiments, be within 20 degrees, or within 10 degrees of normal, or may be normal or nominally normal.

The following is a list of exemplary embodiments of the present description.

Embodiment 1 is an optical system for displaying an image to a viewer comprising:
a first optical lens comprising a curved first major surface;
a partial reflector disposed on and conforming to the curved first major surface of the first optical lens and having an average optical reflectance of at least 30% for each of a first, second and third color light;
a second optical lens comprising a curved first major surface;
an integral reflective polarizer disposed on and conforming to the curved first major surface of the second optical lens, the integral reflective polarizer comprising:
a first plurality of sequentially arranged interference layers configured to reflect the first color light having a first polarization state, transmit the first color light having an orthogonal second polarization state, and transmit the second and third color lights for each of the first and second polarization states;
a second plurality of sequentially arranged interference layers separated from the first plurality of interference layers by one or more first non-interference layers having a total first thickness, the second plurality of interference layers configured to reflect the second color light having the first polarization state, transmit the second color light having the second polarization state, and transmit the first and third color lights for each of the first and second polarization states; and
a third plurality of sequentially arranged interference layers separated from the second plurality of interference layers by one or more second non-interference layers having a total second thickness, the third plurality of interference layers configured to reflect the third color light having the first polarization state, transmit the third color light having the second polarization state, and transmit the first and second color lights for each of the first and second polarization states, each interference layer in the first, second and third pluralities of interference layers reflecting or transmitting light primarily by optical interference, each first and second non-interference layer not reflecting or transmitting light primarily by optical interference, the second plurality of interference layers disposed between the first and third pluralities of interference layers, such that changing each of the first and second thicknesses by 10% increases a magnitude of a chromatic aberration of the optical system by at least 20%.

Embodiment 2 is the optical system of Embodiment 1, wherein the first color light is red, the second color light is green, and the third color light is blue.

Embodiment 3 is the optical system of Embodiment 1 or 2, wherein each interference layer in the first, second and third pluralities of interference layers has a thickness less than 200 nm.

Embodiment 4 is the optical system of any one of Embodiments 1 to 3, wherein each first and second non-interference layer has a thickness greater than 1 micrometer.

Embodiment 5 is the optical system of any one of Embodiments 1 to 4, wherein changing each of the first and second thicknesses by 10% comprises increasing each of the first and second thicknesses by 10%.

Embodiment 6 is the optical system of any one of Embodiments 1 to 4, wherein changing each of the first and second thicknesses by 10% comprises decreasing each of the first and second thicknesses by 10%.

Embodiment 7 is the optical system of any one of Embodiments 1 to 6, wherein changing each of the first and second thicknesses by 10% increases the magnitude of the chromatic aberration of the optical system by at least 30%.

Embodiment 8 is the optical system of any one of Embodiments 1 to 6, wherein changing each of the first and second thicknesses by 10% increases the magnitude of the chromatic aberration of the optical system by at least 40%.

Embodiment 9 is the optical system of any one of Embodiments 1 to 6, wherein changing each of the first and second thicknesses by 10% increases the magnitude of the chromatic aberration of the optical system by at least 50%.

Embodiment 10 is the optical system of any one of Embodiments 1 to 9, wherein the chromatic aberration is a longitudinal chromatic aberration.

Embodiment 11 is the optical system of any one of Embodiments 1 to 10, wherein reflective polarizer comprises opposing first and second major surfaces, the second major surface facing the viewer, the optical system having a first longitudinal chromatic aberration d1 of the first color light to the second color light, such that reversing the reflective polarizer so that the first major surface faces the viewer results in the optical system having a second longitudinal chromatic aberration d2 of the first color light to the third color light, d2>d1.

Embodiment 12 is the optical system of any one of Embodiments 1 to 11, further comprising a retarder disposed between the partial reflector and the reflective polarizer.

Embodiment 13 is an optical imaging system for displaying an image to a viewer, comprising a reflective polarizer comprising first and second reflection zones, such that for light substantially normally incident on the reflective polarizer, the first zone substantially reflects light in a first wavelength range and substantially transmits light in a different non-overlapping second wavelength range, and the second zone substantially reflects light in the second wavelength range and substantially transmits light in the first wavelength range, the first and second reflection zones having first and second thicknesses having corresponding first and second mid-points separated by a distance d, such that a longitudinal chromatic aberration of the optical imaging system of the first wavelength range to the second wavelength range caused when reducing d so that the first and second reflection zones are immediately adjacent is a distance h, $0.3h \leq d \leq 0.7h$.

Embodiment 14 is the optical imaging system of Embodiment 13, wherein reflective polarizer further comprises a third reflection zone disposed between the first and second reflection zones, such that for light substantially normally incident on the reflective polarizer, the third zone substantially reflects light in a third wavelength range between and non-overlapping with the first and second wavelength ranges.

Embodiment 15 is the optical imaging system of Embodiment 13 or 14, further comprising a first optical lens comprising a curved first major surface;
a partial reflector disposed on and conforming to the curved first major surface of the first optical lens and having an average optical reflectance of at least 30% for each of the first and second wavelength ranges; and
a second optical lens comprising a curved first major surface,
wherein the reflective polarizer is disposed on and conforms to the curved first major surface of the second optical lens.

Embodiment 16 is the optical imaging system of Embodiment 15, further comprising a retarder disposed between the partial reflector and the reflective polarizer.

Embodiment 17 is the optical imaging system of any one of Embodiments 13 to 16, wherein changing d by 10% increases a magnitude of longitudinal chromatic aberration by at least 20%.

Embodiment 18 is the optical imaging system of any one of Embodiments 13 to 17, wherein reflective polarizer comprises opposing first and second major surfaces, the second major surface facing the viewer, the optical system having a first longitudinal chromatic aberration d1 of light in the first wavelength range to light in the second wavelength range, such that reversing the reflective polarizer so that the first major surface faces the viewer results in the optical system having a second longitudinal chromatic aberration d2 of light in the first wavelength range to light in the second wavelength range, d2>d1.

Embodiment 19 is the optical imaging system of any one of Embodiments 13 to 18, wherein $0.35h \leq d \leq 0.65h$.

Embodiment 20 is the optical imaging system of any one of Embodiments 13 to 18, wherein $0.4h \leq d \leq 0.6h$.

Embodiment 21 is an optical imaging system for displaying an image of an object to a viewer, comprising a reflective polarizer comprising opposing first and second major surfaces, the first major surface facing the object, the optical imaging system having a first longitudinal chromatic aberration d1 of a first color wavelength to a second color wavelength, such that reversing the reflective polarizer so that the second major surface faces the object results in the optical imaging system having a second longitudinal chromatic aberration d2 of the first color wavelength to the second color wavelength, d2>d1.

Embodiment 22 is the optical imaging system of Embodiment 21, wherein d2 is at least 1.2 times d1, or at least 1.5 times d1, or at least 2 times d1, or at least 2.5 times d1, or at least 3 times d1, or at least 3.5 times d1, or at least 4 times d1.

Embodiment 23 is the optical imaging system of Embodiment 21 or 22, wherein the reflective polarizer comprises:
a first plurality of interference layers configured to reflect light having the first color wavelength for a first polarization state, transmit light having the first color wavelength for an orthogonal second polarization state, and transmit light having light having the second color wavelength for each of the first and second polarization states; and
a second plurality of interference layers configured to reflect light having the second color wavelength for the first polarization state, transmit light having the second color wavelength for the second polarization state, transmit light having light having the first color wavelength for each of the first and second polarization states,
wherein the first and second pluralities of interference layers have respective first and second mid-points, such that changing a distance between the first and second mid-points by 10% increases the first longitudinal chromatic aberration by at least 20%.

Embodiment 24 is the optical imaging system of any one of Embodiments 21 to 23, further comprising a first optical lens comprising a curved first major surface;
a partial reflector disposed on and conforming to the curved first major surface of the first optical lens and having an average optical reflectance of at least 30% for each of the first and second color wavelengths; and
a second optical lens comprising a curved first major surface,
wherein the reflective polarizer is disposed on and conforms to the curved first major surface of the second optical lens.

Embodiment 25 is the optical imaging system of any one of Embodiments 21 to 23, further comprising a retarder disposed between the partial reflector and the reflective polarizer.

Embodiment 26 is the optical imaging system of any one Embodiments 21 to 25, wherein the reflective polarizer comprises first and second reflection zones, such that for light substantially normally incident on the reflective polarizer, the first zone substantially reflects light in a first wavelength range comprising the first color wavelength and substantially transmits light in a different non-overlapping second wavelength range comprising the second color wavelength, and the second zone substantially reflects light in the second wavelength range and substantially transmits light in the first wavelength range, the first and second reflection zones having first and second thicknesses having corresponding first and second mid-points separated by a distance d, such that a longitudinal chromatic aberration of the optical imaging system of the first wavelength range to the second wavelength range caused when reducing d so that the first and second reflection zones are immediately adjacent is a distance h, $0.3h \leq d \leq 0.7h$.

Embodiment 27 is an optical imaging system for displaying an image of an object to a viewer, comprising a reflective polarizer comprising a first major surface facing the object and a plurality of polymeric interference layers numbering at least 50 and reflecting and transmitting light primarily by optical interference in a predetermined wavelength range extending at least from 400 to 600 nm, such that reversing the reflective polarizer so that the first major surface faces away from the object increases a longitudinal chromatic aberration of the optical imaging system in the predetermined wavelength range by at least 20%.

Embodiment 28 is the optical imaging system of Embodiment 27, wherein reversing the reflective polarizer so that the first major surface faces away from the object increases the longitudinal chromatic aberration of the optical imaging system in the predetermined wavelength range by at least 50%.

Embodiment 29 is the optical imaging system of Embodiment 27 or 28, wherein reversing the reflective polarizer so that the first major surface faces away from the object increases the longitudinal chromatic aberration of the optical imaging system in the predetermined wavelength range by at least 100%.

Embodiment 30 is the optical imaging system of any one of Embodiments 27 to 29, wherein reversing the reflective polarizer so that the first major surface faces away from the object increases the longitudinal chromatic aberration of the optical imaging system in the predetermined wavelength range by at least 150%.

Embodiment 31 is the optical imaging system of any one of Embodiments 27 to 30, wherein reversing the reflective polarizer so that the first major surface faces away from the object increases the longitudinal chromatic aberration of the optical imaging system in the predetermined wavelength range by at least 200%, or at least 250%, or at least 300%.

Embodiment 32 is the optical imaging system of any one of Embodiments 27 to 31, wherein the predetermined wavelength range extends at least from 400 to 700 nm.

Embodiment 33 is the optical imaging system of any one Embodiments 27 to 32 wherein the reflective polarizer comprises first and second reflection zones, such that for light substantially normally incident on the reflective polarizer, the first zone substantially reflects light in a first wavelength range within the predetermined wavelength range and substantially transmits light in a different non-overlapping second wavelength range within the predetermined wavelength range, and the second zone substantially reflects light in the second wavelength range and substantially transmits light in the first wavelength range, the first and second reflection zones having first and second thicknesses having corresponding first and second mid-points separated by a distance d, such that a longitudinal chromatic aberration of the optical imaging system of the first wavelength range to the second wavelength range caused when reducing d so that the first and second reflection zones are immediately adjacent is a distance h, 0.3h≤d≤0.7h.

Embodiment 34 is the optical imaging system of any one Embodiments 27 to 33, wherein the reflective polarizer is integrally formed and comprises:

a first plurality of sequentially arranged interference layers configured to reflect a first color light having a first polarization state, transmit the first color light having an orthogonal second polarization state, and transmit second and third color lights for each of the first and second polarization states;

a second plurality of sequentially arranged interference layers separated from the first plurality of interference layers by one or more first non-interference layers having a total first thickness, the second plurality of interference layers configured to reflect the second color light having the first polarization state, transmit the second color light having the second polarization state, and transmit the first and third color lights for each of the first and second polarization states; and a third plurality of sequentially arranged interference layers separated from the second plurality of interference layers by one or more second non-interference layers having a total second thickness, the third plurality of interference layers configured to reflect the third color light having the first polarization state, transmit the third color light having the second polarization state, and transmit the first and second color lights for each of the first and second polarization states, each interference layer in the first, second and third pluralities of interference layers reflecting or transmitting light primarily by optical interference, each first and second non-interference layer not reflecting or transmitting light primarily by optical interference, the second plurality of interference layers disposed between the first and third pluralities of interference layers, such that changing each of the first and second thicknesses by 10% increases the longitudinal chromatic aberration of the optical imaging system in the predetermined wavelength rang by at least 20%.

Embodiment 35 is the optical imaging system of any one Embodiments 27 to 34, further comprising a first optical lens comprising a curved first major surface;

a partial reflector disposed on and conforming to the curved first major surface of the first optical lens and having an average optical reflectance of at least 30% in the predetermined wavelength range; and a second optical lens comprising a curved first major surface, wherein the reflective polarizer is disposed on and conforms to the curved first major surface of the second optical lens.

Embodiment 36 is the optical imaging system of Embodiment 35, further comprising a retarder disposed between the partial reflector and the reflective polarizer.

EXAMPLES

An optical system similar to optical system 850 was modeled using Zemax OpticStudio® modeling software. The reflective polarizer was modeled as a 40 micron thick element on the first major surface 21 of the second optical lens 20. The reflection of light in the block polarization state was modeled as occurring either at the outermost major surface opposite the second optical lens 20 or at the major surface immediately adjacent the second optical lens 20. The first optical lens 10 was modeled as N-BK7 glass and the second optical lens 20 was modeled as acrylic. The first major surface 11 of the first optical lens 10 was spherical with a radius of curvature of 51.7 mm and the second major surface 12 of the first optical lens 10 was planar. The first optical lens 10 had a thickness of 7 mm at the center of the first optical lens 10. The first and second major surfaces 21 and 22 of the second optical lens 20 were even aspherical surfaces described by Formula 1:

$$z = \frac{cr^2}{1 + [1 - (1+k)c^2r^2]^{1/2}} + Er^4 + Fr^6 + Gr^8 \quad \text{(Formula 1)}$$

For the first major surface 21, using mm for lengths, $c=-1/(120.4)$, $k=0$, $E=2.5\text{E}-06$, and F and G were zero. For the second major surface 22, using mm for lengths, $c=1/(231.3)$, $k=4.91$, $E=-1.43\text{E}-05$, $F=2.11\text{E}-08$, and $G=-9.33\text{E}-11$. The second optical lens 20 had a thickness of 3.2 mm at the center of the second optical lens 20.

The position of the focal plane relative to the partial reflector (in FIG. 9, this is the distance from point 54 to the partial reflector 30 along the optical axis 155) was determined as function of wavelength and is reported in the following table for three wavelengths.

| Wavelength (nm) | Focal Plane (mm) for reflection at outermost surface | Focal Plane (mm) for reflection 40 micrometers below outermost surface |
| --- | --- | --- |
| 486.133 | 0.079771 | 0.021588 |
| 587.562 | 0.13706 | 0.078558 |
| 656.273 | 0.162253 | 0.103613 |

The longitudinal chromatic aberration over a predetermined wavelength range from about 486 to about 656 nm for the case where the reflection occurred at the outermost surface was 0.162253 mm−0.079771 mm=0.082482 mm or about 82.5 micrometers. The longitudinal chromatic aberration over the predetermined wavelength range for the case where the reflection occurred 40 micrometers below the outermost surface was 0.103613 mm−0.021588 mm=0.082025 mm or about 82.0 micrometers.

Spot diagrams were also determined for the three wavelengths in the table above using the Zemax software. Spot diagrams determine an image size from a point object. In the absence of aberrations, a point object will converge to an image point. Aberrations increase the size of the spot. Chromatic aberrations can result in some wavelengths producing a larger spot and can therefore increase the overall spot size. For the case where the reflection occurred at the outermost surface, the root-mean-square (RMS) spot radius was 13.2 micrometers and the geometric spot radius was 21.9 micrometers. For the case where the reflection occurred 40 micrometers below the outermost surface, the RMS spot radius was 11.6 micrometers and the geometric spot radius was 29.7 micrometers.

A reflective polarizer having layers adapted to reflect light having a wavelength of about 486 nm at the outermost major surface and adapted to reflect light having a wavelength of about 656 nm at a surface 40 micrometers below this outermost surface has a longitudinal chromatic aberration of 0.103613 mm−0.07977 mm=0.023842 mm or about 23.8 micrometers. In this case, the RMS spot radius was determined to be 8.0 micrometers and the geometric spot radius was determined to be 12.5 micrometers.

Reversing the reflective polarizer so that the wavelength of about 656 nm is reflected at the outermost major surface and the wavelength of about 486 nm is reflected at a surface 40 micrometers below this outermost surface gives a longitudinal chromatic aberration of 0.162253-0.021588=0.140665 mm or about 141 micrometers. In this case, the RMS spot radius was determined to be 16.7 micrometers and the geometric spot radius was determined to be 28.7 micrometers.

All cited references, patents, and patent applications in the above application for letters patent are herein incorporated by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system for displaying an image to a viewer comprising:
a first optical lens comprising a curved first major surface;
a partial reflector disposed on and conforming to the curved first major surface of the first optical lens and having an average optical reflectance of at least 30% for each of a first, second and third color light;
a second optical lens comprising a curved first major surface;
an integral reflective polarizer disposed on and conforming to the curved first major surface of the second optical lens, the integral reflective polarizer comprising:
a first plurality of sequentially arranged interference layers configured to reflect the first color light having a first polarization state, transmit the first color light having an orthogonal second polarization state, and transmit the second and third color lights for each of the first and second polarization states;
a second plurality of sequentially arranged interference layers separated from the first plurality of interference layers by one or more first non-interference layers having a total first thickness, the second plurality of interference layers configured to reflect the second color light having the first polarization state, transmit the second color light having the second polarization state, and transmit the first and third color lights for each of the first and second polarization states; and
a third plurality of sequentially arranged interference layers separated from the second plurality of interference layers by one or more second non-interference layers having a total second thickness, the third plurality of interference layers configured to reflect the third color light having the first polarization state, transmit the third color light having the second polarization state, and transmit the first and second color lights for each of the first and second polarization states, each interference layer in the first, second and third pluralities of interference layers reflecting or transmitting light primarily by optical interference, each first and second non-interference layer not reflecting or transmitting light primarily by optical interference, the second plurality of interference layers disposed between the first and third pluralities of interference layers, such that increasing or decreasing both of the first and second thicknesses by 10% increases a magnitude of a chromatic aberration of the optical system by at least 20%.

2. The optical system of claim 1, wherein the first color light is red, the second color light is green, and the third color light is blue.

3. The optical system of claim 1, wherein each interference layer in the first, second and third pluralities of interference layers has a thickness less than 200 nm, and each first and second non-interference layer has a thickness greater than 1 micrometer.

4. The optical system of claim 1, wherein increasing or decreasing both of the first and second thicknesses by 10% comprises increasing both of the first and second thicknesses by 10%.

5. The optical system of claim 1, wherein increasing or decreasing both of the first and second thicknesses by 10% comprises decreasing both of the first and second thicknesses by 10%.

6. The optical system of claim 1, wherein the chromatic aberration is a longitudinal chromatic aberration.

7. The optical system of claim 1, wherein the reflective polarizer comprises opposing first and second major surfaces, the second major surface facing the viewer, the optical system having a first longitudinal chromatic aberration d1 of the first color light to the second color light, such that reversing the reflective polarizer so that the first major surface faces the viewer results in the optical system having a second longitudinal chromatic aberration d2 of the first color light to the third color light, d2>d1.

8. An optical imaging system for displaying an image of an object to a viewer, comprising a reflective polarizer comprising a first major surface facing the object and a plurality of polymeric interference layers numbering at least 50 and reflecting and transmitting light primarily by optical interference in a predetermined wavelength range extending at least from 400 to 600 nm, such that reversing the reflective polarizer so that the first major surface faces away from the object increases a longitudinal chromatic aberration of the optical imaging system in the predetermined wavelength range by at least 20%;
wherein the reflective polarizer is integrally formed and comprises:
a first plurality of sequentially arranged interference layers configured to reflect a first color light having a first polarization state, transmit the first color light having an orthogonal second polarization state, and transmit second and third color lights for each of the first and second polarization states;
a second plurality of sequentially arranged interference layers separated from the first plurality of interference layers by one or more first non-interference layers having a total first thickness, the second plurality of interference layers configured to reflect the second color light having the first polarization state, transmit the second color light having the second polarization state, and transmit the first and third color lights for each of the first and second polarization states; and
a third plurality of sequentially arranged interference layers separated from the second plurality of interference layers by one or more second non-interference layers having a total second thickness, the third plurality of interference layers configured to reflect the third color light having the first polarization state, transmit the third color light having the second polarization state, and transmit the first and second color lights for each of the first and second polarization states, each interference layer in the first, second and third pluralities of interference layers reflecting or transmitting light primarily by optical interference, each first and second non-interference layer not reflecting or transmitting light primarily by optical interference, the second plurality of interference layers disposed between the first and third pluralities of interference layers, such that increasing or decreasing both of the first and second thicknesses by 10% increases the longitudinal chromatic aberration of the optical imaging system in the predetermined wavelength range by at least 20%.

9. The optical imaging system of claim 8, wherein the reflective polarizer comprises first and second reflection zones, such that for light substantially normally incident on the reflective polarizer, the first zone substantially reflects light in a first wavelength range within the predetermined wavelength range and substantially transmits light in a different non-overlapping second wavelength range within the predetermined wavelength range, and the second zone substantially reflects light in the second wavelength range and substantially transmits light in the first wavelength range, the first and second reflection zones having first and second thicknesses having corresponding first and second mid-points separated by a distance d, such that a longitudinal chromatic aberration of the optical imaging system of the first wavelength range to the second wavelength range caused when reducing d so that the first and second reflection zones are immediately adjacent is a distance h, $0.3h \leq d \leq 0.7h$.

10. The optical imaging system of claim 8 having a first longitudinal chromatic aberration d1 of a first color wavelength to a second color wavelength, such that reversing the reflective polarizer so that the first major surface faces away from the object results in the optical imaging system having a second longitudinal chromatic aberration d2 of the first color wavelength to the second color wavelength, d2>d1.

11. The optical imaging system of claim 10,
wherein the first and second pluralities of interference layers have respective first and second mid-points, such that changing a distance between the first and second mid-points by 10% increases the first longitudinal chromatic aberration d1 by at least 20%.

\* \* \* \* \*